United States Patent
Kußmaul et al.

(10) Patent No.: US 11,151,196 B2
(45) Date of Patent: Oct. 19, 2021

(54) CONTENT VALIDATION

(71) Applicant: INTERNATIONAL BUSINESS MACHINES CORPORATION, Armonk, NY (US)

(72) Inventors: Timo Kußmaul, Boeblingen (DE); Udo Schoene, Boeblingen (DE); Uwe Hansmann, Tuebingen (DE); David Winter, Boeblingen (DE); Hendrik Haddorp, Holzgerlingen (DE); Anke Lüdde, Herrenberg (DE); Andreas Prokoph, Boeblingen (DE); Oliver Rudolph, Tuebingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 170 days.

(21) Appl. No.: 16/224,288

(22) Filed: Dec. 18, 2018

(65) Prior Publication Data

US 2020/0192945 A1 Jun. 18, 2020

(51) Int. Cl.
| G06F 7/00 | (2006.01) |
| G06F 16/00 | (2019.01) |
| G06F 16/903 | (2019.01) |
| G06F 17/10 | (2006.01) |
| G06K 9/62 | (2006.01) |
| G06F 16/9538 | (2019.01) |

(52) U.S. Cl.
CPC .... *G06F 16/90335* (2019.01); *G06F 16/9538* (2019.01); *G06F 17/10* (2013.01); *G06K 9/6256* (2013.01)

(58) Field of Classification Search
None
See application file for complete search history.

(56) References Cited

U.S. PATENT DOCUMENTS

| 8,621,222 | B1 * | 12/2013 | Das | H04L 9/321 713/176 |
| 2004/0148633 | A1 | 7/2004 | Skinner et al. | |
| 2012/0272325 | A1 | 10/2012 | Stone et al. | |
| 2012/0309515 | A1 * | 12/2012 | Chung | A63F 13/00 463/31 |

(Continued)

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.

(Continued)

*Primary Examiner* — Tuan A Pham
(74) *Attorney, Agent, or Firm* — Cuenot, Forsythe & Kim, LLC

(57) ABSTRACT

Validating revisions of digital content managed by a content management system can include determining a quality metric value, the value indicating coverage of the digital content by a set of training data used to train a ranking model for ranking responses to search queries of the digital content. Additionally, content validation can include invoking a ranking editor in response to the quality metric value deviating from a predetermined threshold by more than a predetermined amount. Content validation can further include extending the set of training data using the interactive ranking editor.

11 Claims, 10 Drawing Sheets

(56) References Cited

U.S. PATENT DOCUMENTS

| | | | |
|---|---|---|---|
| 2015/0026825 A1* | 1/2015 | Dube | G06F 3/04855 |
| | | | 726/28 |
| 2015/0074397 A1* | 3/2015 | Dube | G06F 21/10 |
| | | | 713/168 |
| 2015/0278171 A1 | 10/2015 | Lefebvre et al. | |
| 2017/0132368 A1 | 5/2017 | Nuggehalli et al. | |
| 2018/0096020 A1 | 4/2018 | Sreenivasa et al. | |
| 2018/0225370 A1* | 8/2018 | Cora | G06K 9/6254 |

OTHER PUBLICATIONS

"Improving result relevance wiht the API," [online] IBM Cloud, Sep. 6, 2018, retrieved from the Internet: <https://console.bluemix.net/docs/services/discovery/train.html#improving>, 2 pg.

Curtis, K. et al., "Metadata—The Key to Content Management Services ," [online] In IEEE Proc. of the Meta-Data, Apr. 6, 1999, pp. 6-7, retrieved from the Internet: <http://www.ee.ucl.ac.uk/~fstentif/curtis.htm>.

Surges, C.J., "From ranknet to lambdarank to lambdamart: An overview," Microsoft Research Technical Report, MSR-TR-2010-82, 19 pg.

"Discovery," [online] IBM Cloud, Nov. 9, 2018, retrieved from the Internet: <https://console.bluemix.net/catalog/services/discovery>, 1 pg.

"Document Content Management Software System," [online] MasterControl [retrieved Dec. 18, 2018], retreived from ihe Interent: <https://www.mastercontrol.com/document-control-software/conten . . . >, 3 pg.

Zheng, Z. et al., "A general boosting method and its application to learning ranking functions for web search," [online] In Advances in Neural Information Processing Systems, 2008, pp. 1697-1704.

* cited by examiner

CONTENT VALIDATION

BACKGROUND OF THE INVENTION

The present disclosure relates to data processing systems, and more particularly, to content management systems.

A content management system can facilitate the management of digital content across Websites, mobile apps, and the like. Such a system can enable data formatting, editing, indexing, and publishing, as well as digital content searching and retrieval. A content management system can, for example, serve as an interface with which a user can add, modify, and remove digital content residing on a network server that hosts a Website.

SUMMARY

A method includes determining, using computer hardware, a quality metric value in response to revising digital content managed by a content management system. The value can indicate coverage of revised digital content by a set of training data used to train a ranking model for ranking responses to search queries of the digital content. Additionally, the method can include invoking a ranking editor in response to the quality metric value deviating from a predetermined threshold by more than a predetermined amount. The method also can include extending the set of training data using the interactive ranking editor.

A system includes at least one processor programmed to initiate executable operations. The executable operations can include determining a quality metric value in response to revising digital content managed by a content management system. The value can indicate coverage of revised digital content by a set of training data used to train a ranking model for ranking responses to search queries of the digital content. Additionally, the executable operations can include invoking a ranking editor in response to the quality metric value deviating from a predetermined threshold by more than a predetermined amount. The executable operations can further include extending the set of training data using the interactive ranking editor.

A computer program product includes a computer-readable storage medium having program code stored thereon. The program code is executable by computer hardware to initiate operations. The operations can include determining a quality metric value in response to revising digital content managed by a content management system. The value can indicate coverage of revised digital content by a set of training data used to train a ranking model for ranking responses to search queries of the digital content. Additionally, the operations can include invoking a ranking editor in response to the quality metric value deviating from a predetermined threshold by more than a predetermined amount. The operations can further include extending the set of training data using the interactive ranking editor.

DETAILED DESCRIPTION

Figure 1:
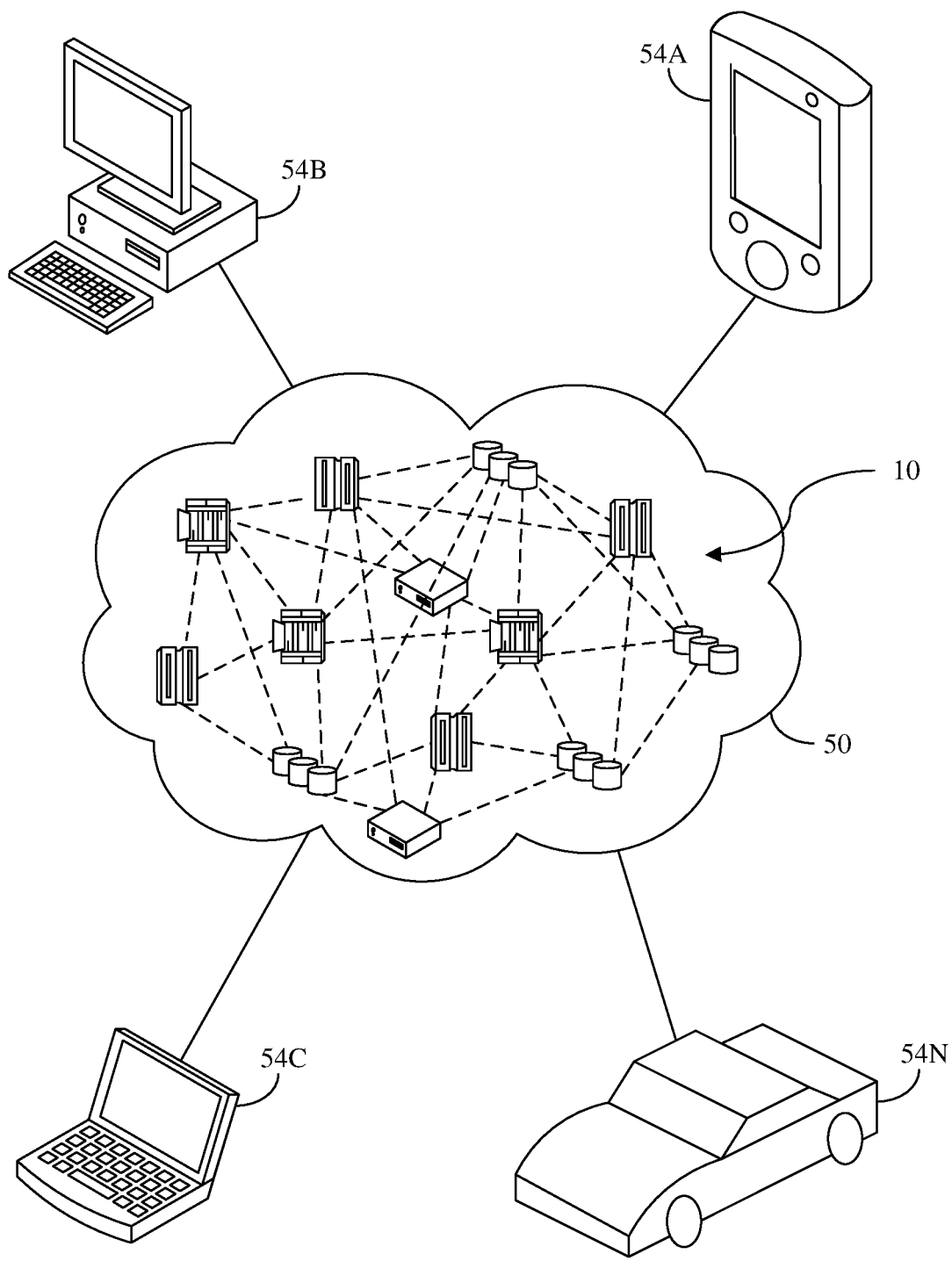
FIG. 1 depicts a cloud computing environment according to an embodiment of the present invention.

The present disclosure relates to data processing systems, particularly computer-based content management systems.

A content management system is a data processing system that manages the creation and modification of digital content. Different content management systems can provide different functionalities. Such functions can include indexing, searching, retrieving and publishing digital content. One type of content management system, for example, can provide a user interface for adding digital content, modifying the content, and removing the content from a Web site.

One feature common to virtually every content management system is the capability to create and modify digital content that is managed by the system. If the managed content (e.g., a commercial Website) is to remain relevant and useful, new digital content must be added and old content must be updated as circumstances change.

Digital content revisions, however, may lessen the effectiveness of a search service (or engine) that is used to search and retrieve items of digital content managed by the content management system. A search service processes search queries by selecting and ranking a set of digital content items based on specific search parameters. The ranking indicates the item's relevance with respect to the specific search parameters. Rankings are determined using a model that can "learn" to rank content using a set of training data. A ranking model relies on machine learning (e.g., algorithms such as RankNet, LambdaRank, and LambdaMART) for learning to rank content based on the set of training data. The training data comprises a set of sample queries with a set of samples (query responses). If the training data does not adequately cover the relevant digital content, rankings based on the model trained using the data may be deficient. Training data that does not, for example, include samples or otherwise reference one or more digital content items does not adequately "cover" the items, and a model trained using the training data is not likely to rank the items accurately.

If the ranking of search results is poor, the overall search process is likely to suffer as a result. The efficiency of the system presenting managed content to a user is reduced as the user is forced to spend additional time refining search queries in order to find whatever item the user is searching for. Beyond merely being inefficient, poor search capabilities can produce other negative effects. If, for example, the search involves on-line shopping, poor search results can hurt a business that relies on the content management system to manage the business's Website. Poor search results are at best frustrating to a customer and at worse may cost the business a customer who out of frustration turns to a competing business's on-line store.

The methods, systems, and computer program products disclosed herein address these and similar issues by providing content validation of revisions to managed digital content. Content validation is initiated when a content management system is updated, either by adding digital content items (e.g., text document) or otherwise revising digital content managed by the system. The content validation determines whether the current training data that is used by the ranking service to create a ranking model sufficiently covers the revisions to managed digital content. If not, the content validation extends a current set of training data to cover the digital content revisions. The set is extended by adding sample queries and corresponding response samples (digital content items identified in response to a search query) and ranking the response samples.

Content validation, according to various embodiments described herein, determines whether digital content revisions are covered by current training data before the revisions are incorporated in or saved to a database of digital content managed by the content management system. If the digital content revisions (e.g., new or modified digital content items) are not sufficiently covered, then a procedure is initiated that selects a set of search queries, executes the search queries, and extends the set of training data by ranking and inserting one or more new sample searches and corresponding sample responses.

In a particular embodiment, the procedure selects search queries from the ground truth. The expression "ground truth" is used in the context of machine learning to indicate the classification accuracy of a set of training data used for supervised machine learning. In the present context the expression denotes the specific set of training data that when used to train the ranking model produces the most accurate model. The selected search queries are executed on the ground truth, including the newly added items (sample queries and sample responses) that extend the set of training data. The newly added items are ranked. The now-extended set of training data comprises a new ground truth. Before incorporating the new ranking of the newly added items into the current set of training data, however, an automatic determination is made as to whether modification of the current ranking model is needed.

The content validation embodiments disclosed herein improve the performance of the content management system and corresponding search service. Content validation improves the performance of the content management system by allowing updates and modifications to current digital content without raising the risk of inaccurate or inadequate (or non-existent) ranking of the updated and modified content. Poor rankings yield poor search results. By enhancing the accuracy of the ranking of new or modified digital content, content validation also improves the search service's performance. Digital content items that are accurately ranked can be more readily identified and thus more rapidly retrieved by the search service.

A content validation system can be incorporated in, or used in conjunction with, a content management system. The content validation system can be implemented in a computer. The computer hosting the content validation system can be communicatively coupled with a content management system directly or via a network connection. For example, the content validation system can be implemented on a network server. The network server can be, for example, a cloud-based server.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a Web browser (e.g., Web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a Web browser).

Figure 2:
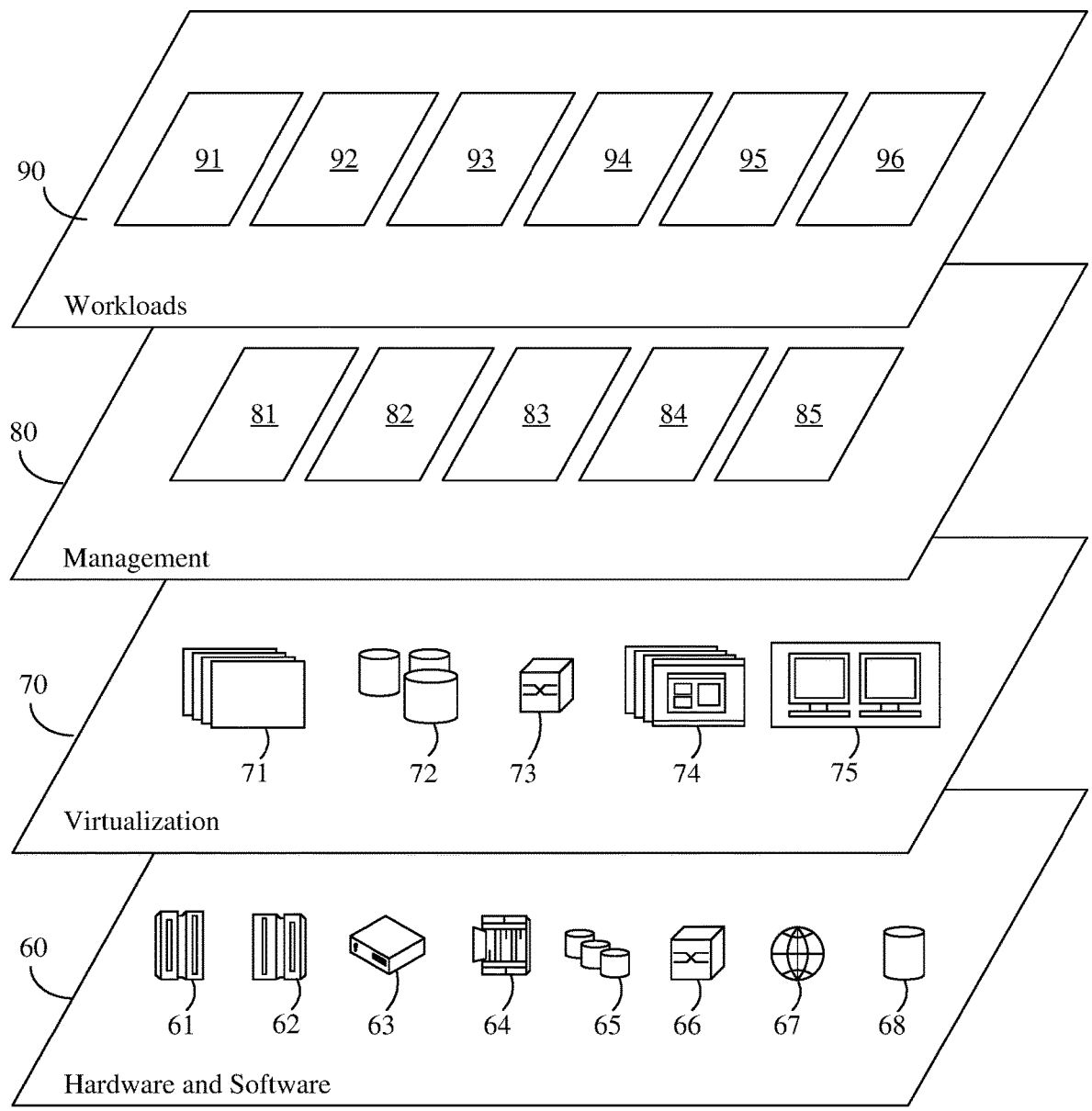
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content validation system (system) 96.

In one or more embodiments, system 96 can include a quality monitoring component and a ranking editor. Optionally, system 96 also can include a user interface. The quality monitoring component calculates a quality metric, which indicates the degree to which a current set of training data covers revisions to digital content managed by a content management system. The quality monitoring component can be automatically invoked in response to a user-author attempting to save new or modified digital content to a databased containing digital content managed by the content management system. Alternatively, the quality monitoring component can be invoked in response to the user-author sending to a search service a request to index the new or modified digital content.

The quality monitoring component automatically invokes the ranking editor in response to the quality metric falling below a predetermined threshold (or otherwise deviating from a predetermined threshold by more than predetermined amount). The ranking editor invokes a search service to execute search queries. The ranking editor extends the set of training data by inserting items corresponding to the digital content revisions in a rank ordered list of items returned in response to the queries. The ranking editor also ranks the newly inserted items. The ranking editor thereby extends the set of training data that is used to train the ranking model. The ranking editor also determines whether the current model needs to be trained anew using the extended set of training data, and if so, initiates the re-training.

The extending of the set of training data, as with the other content validation procedures, can be performed autonomously with various data processing systems such as those described below. In another embodiment, however, a user-author can participate in this portion of the content validation process, the participation facilitated by the user interface. In accordance with this embodiment, visual representations of the results of the search queries executed by the search service are displayed as a rank ordered list. With the user interface, the user-author can drag and drop a visual representation of a content item into the rank ordered list. Based on the inserted item's position on the rank ordered list, the rank of the newly inserted item is determined automatically. The determination as whether to retrain the ranking model is also made automatically.

Figure 3:
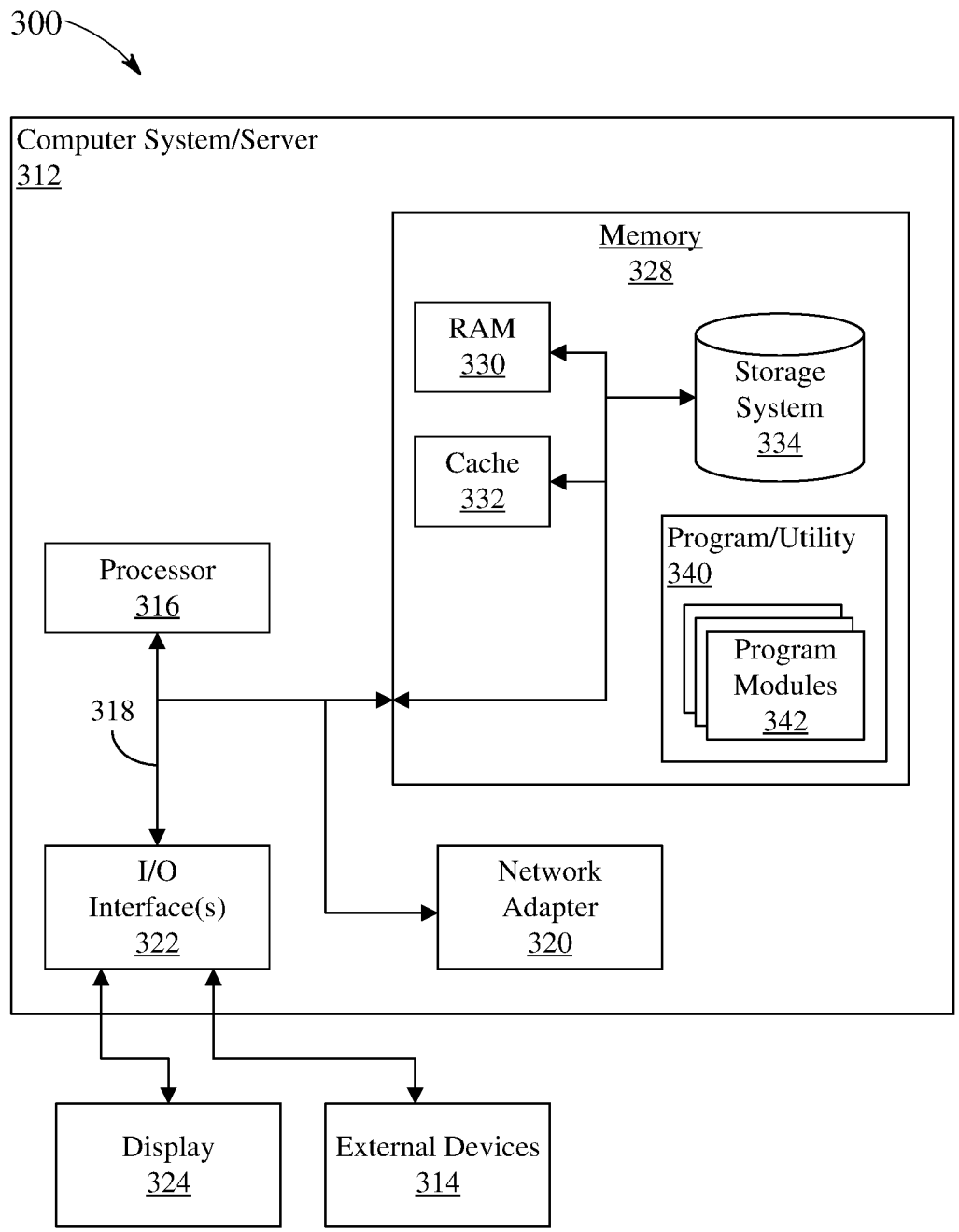
FIG. 3 depicts a cloud computing node according to an embodiment of the present invention.

Referring now to FIG. 3, a schematic of an example of a cloud computing node is shown. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

Cloud computing node 300 includes a computer 312, which is operational with numerous other general-purpose or special-purpose computing system environments or configurations. Examples of well-known computing systems, environments, and/or configurations that may be suitable for use with computer 312 include, but are not limited to, personal computers, servers, thin clients, thick clients, handheld or laptop devices, multiprocessor systems, microprocessor-based systems, set top boxes, programmable consumer electronics, network PCs, minicomputers, mainframe computers, and distributed cloud computing environments that include any of the above systems or devices, and the like.

Computer 312 may be described in the general context of computer system-executable instructions, such as program modules, being executed by a computer or computing system. Generally, program modules may include routines, programs, objects, components, logic, data structures, and so on that perform particular tasks or implement particular abstract data types. Computer 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer 312 in cloud computing node 300 is shown in the form of a general-purpose computing device. The components of computer 312 may include, but are not limited to, one or more processors 316, a memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and a PCI express (PCIe) bus.

Computer 312 typically includes a variety of computer-readable media. Such media may be any available media that is accessible by computer 312, and includes both volatile and non-volatile media, removable and non-removable media.

Memory 328 can include computer-readable media in the form of volatile memory, such as random-access memory (RAM) 330 and/or cache memory 332. Computer 312 may further include other removable/non-removable, volatile/non-volatile computer storage media. By way of example, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

For example, one or more of the program modules may include system 96 or portions thereof. Program/utility 340 is executable by processor 316. Program/utility 340 and any data items used, generated, and/or operated upon by node 300 are functional data structures that impart functionality when employed by node 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 312 may also communicate with one or more external devices 314 such as a keyboard, a pointing device, a display 324, etc.; one or more devices that enable a user to interact with computer 312; and/or any devices (e.g., network card, modem, etc.) that enable computer 312 to communicate with one or more other computing devices. Such communication can occur via Input/Output (I/O) interfaces 322. Computer 312 can communicate with one or more networks such as a local area network (LAN), a general wide area network (WAN), and/or a public network (e.g., the Internet) via network adapter 320. As depicted, network adapter 320 communicates with the other components of computer 312 via bus 318. It should be understood that although not shown, other hardware and/or software components could be used in conjunction with computer 312. Examples include, but are not limited to, the following: microcode, device drivers, redundant processing units, external disk drive arrays, RAID systems, tape drives, and data archival storage systems.

While node 300 is used to illustrate an example of a cloud computing node, it should be appreciated that a computer system using an architecture the same as or similar to that shown in FIG. 3 may be used in a non-cloud computing implementation to perform the various operations described herein. In this regard, the example embodiments described herein are not intended to be limited to a cloud computing environment.

Figure 4:
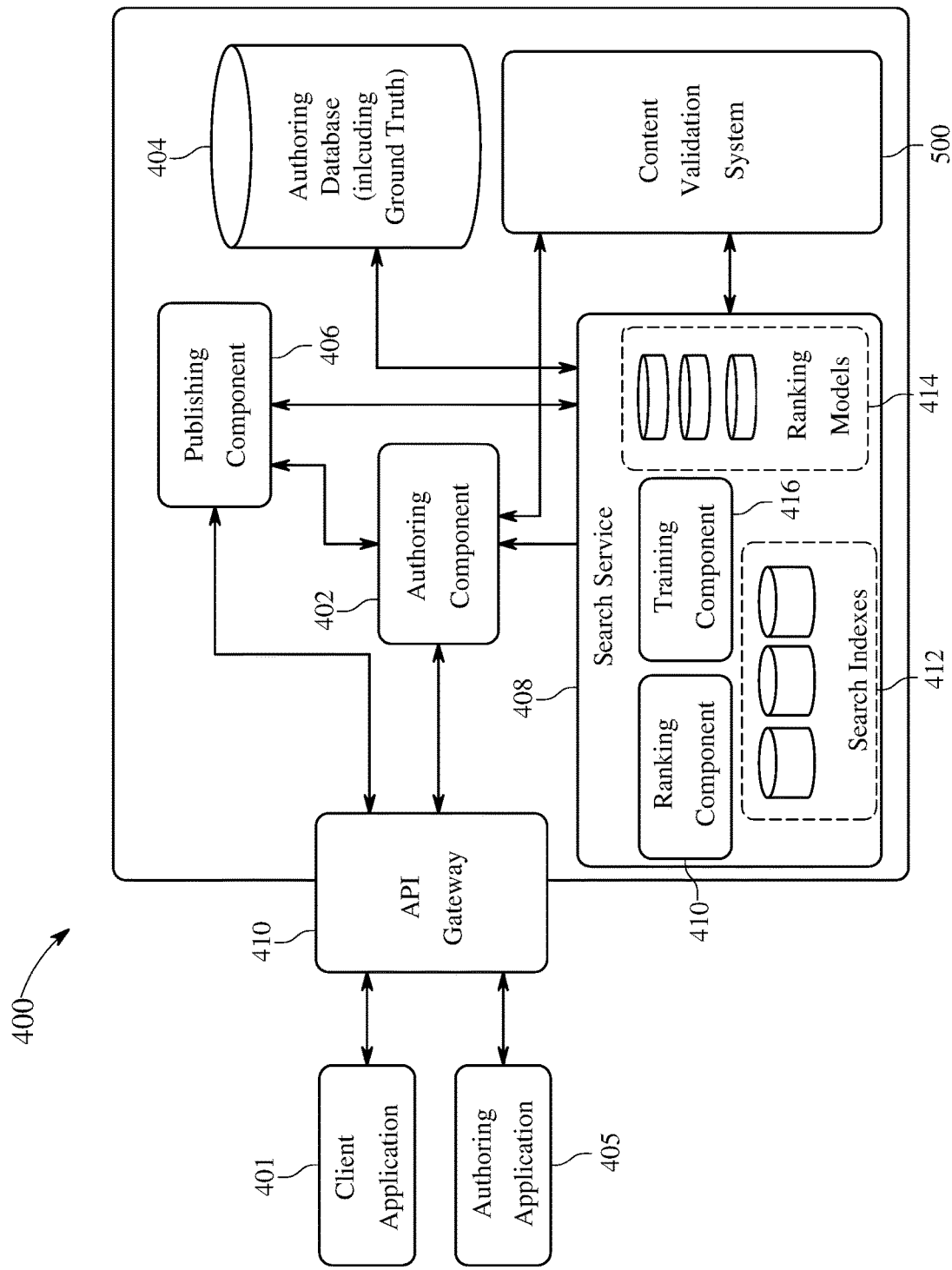
FIG. 4 depicts an example content management system with which a content validation system can be used according to an embodiment of the present invention.

FIG. 4 depicts an example of a content management system 400 with which a content validation system such as system 96 can be used, according to one embodiment. Content management system 400 illustratively includes authoring component 402, authoring database 404, publishing component 406, and search service 408. Illustratively, content management system 400 also includes application program interface (API) gateway 410 that can provide a communication protocol and a set of subroutines for performing certain specific tasks, enabling a user to interact with the system via client applications 401 and authoring applications 405.

Content management system 400 manages the creation and modification of digital content items. The digital content items include text documents, webpages, images, videos, code scripts, and other electronically formatted data. Content management system 400 provides functionality for defining different types of digital content items. More particularly, content management system 400 provides a predefined list of possible digital content item types that can be selected by the user with the authoring component 402. A digital content item can be represented and stored according to a specific field (e.g., "type" or "classification" field) of the item.

Authoring component 402 enables a user-author to create, edit, and manage content items. Optionally, an authoring interface can be part of the authoring component, or the user-author can perform creation, editing, and other management functions via distinct authoring APIs. When a user-author creates or otherwise modifies one or more digital content items, authoring component 402 can store the digital content revisions in authoring database 404.

Publishing component 406 publishes digital content items from authoring component 402 and database 404 to a delivery system, such as a content delivery network (not shown). The content delivery system or network can be relied upon to make digital content items managed by content management system 400 readily available and easily accessible to the public or select users. Publishing component 406 can incorporate additional functionality, such as an indexing function that indexes the digital content items. Indexing digital content items facilitates the searching for and locating the items. Other functions that can be provided by publishing component 406 include, for example, modifying, transforming, and prerendering digital content items. Optionally, publishing with publishing component 406 can be initiated by a user, invoked according to a predetermined schedule, and/or initiated in response to a publishing API operation.

Search service 408 provides functionality for searching digital content items (e.g., text documents) stored in an unstructured data format. The functionality is provided by creating a search index, whereby a specific digital content item corresponds to a specific index in a specific form that is well-suited for efficient searching by search service 408. A content indexing API enables search service 408 to locate an indexed item. A query API allows a client (e.g., a service or application) to issue a search query.

A search query contains a set of parameters, such as search terms, which specify search criteria for locating digital content items stored in a search index. Search service 408 processes a search query by selecting and ranking a set of digital content items according to the search parameters. The ranking determines a value that ranks a digital content item according to the item's relevance to specific search terms. Search service 408 can use different ranking functions for determining the ranking value. A query contains parameters that determine the ranking of items returned in response to the query.

Search service 408 can use different ranking methods, such as term frequency-inverse document frequency (tf-idf), the value of which increases proportionally to the number of times a term appears in a digital content item (e.g., word in a text document), offset by the frequency that the item occurs in a corpus of such items. The tf-idf reflects the relative importance of the term (e.g., word) with respect to an item in the corpus, or collection, of items (e.g., text documents). Multiple search indexes can be managed by search service 408.

Search service 408 includes ranking component 410 for ranking digital content items that are located using a set of search indexes 412. The ranking can be based on one or more ranking models 414. The models are constructed by training component 416 using supervised, semi-supervised, and/or reinforcement machine learning. The machine-learned models can be implemented using techniques such as LambdaMART, which is a boosted-tree version of the LambdaRank based on RankNet. RankNet, LambdaRank, and LambdaMART are known algorithms relating to object ranking. Application of these methods can be used for machine learning to train ranking models used by search service 408.

Training relies on a set of training data. Training data comprises lists of digital content items with a specified partial ordering of items in each list. The ordering can be established using a numerical or ordinal score or based on a binary classification (e.g., "relevant" or "not relevant") for each digital content item.

Ranking component 410 can be invoked in a training mode. A set of training data can be passed to ranking component 410. Ranking component 410 can execute training component 416, which implements a specific machine learning algorithm. The machine learning algorithm constructs a ranking model based on the specific training data. The ranking model "learns" to rank search results similar to the way that the training data is ranked, depending on the machine learning method used. Once training is accomplished using the training data, the model can be used to rank digital content items that are returned in response to a search query.

The following are examples of digital content items used as training data for constructing a model to rank musical content (e.g., digitally stored recorded music or sheet music text) returned in response to a set of corresponding search queries (in quotes): "find me some good dubstep songs," PRODUCT~119277, 4; ARTICLE~1560, 3; ARTICLE~1520, 1 "find me some good trap songs," PRODUCT~119034, 4; ARTICLE~1520, 3; ARTICLE~1520, 1 "find me some good house music," PRODUCT~118882, 3; PRODUCT~118856, 4; ARTICLE~1099, 2 "find me some good trance songs," PRODUCT~118824, 4; ARTICLE~1507, 3; ARTICLE~1575, 1

The training data comprises four sample queries and four samples (query responses). Each search query returns a sample represented by 2-tuple comprising a digital content item identification (I.D.) and corresponding rank value, <item I.D., rank value>.

As noted above, the quality of the ranking model, regardless of the machine learning algorithm, depends critically on the training data used to train the model. If the training data does not sufficiently represent, or "cover" adequately, the digital content that is searched, the search results returned in response to a search query will suffer. Inadequate search results can diminish the performance of a content management system such as system 400. If search results are poor, efficiency is reduced as a user is forced to spend additional time refining search queries. If the search involves on-line shopping—searching, e.g., for music through a Web-based music store—poor search results can hurt the business relying on the content management system. Poor search results are at best frustrating to a customer and at worse may cost the business a customer who out of frustration turns to a competing business's on-line store.

As also noted above, an essential role of a content management system is to enable a user-author to create and modify digital content managed by the system. As circumstances change new digital content must be added and old content must be updated. Such digital content modification is essential to the functionality of content managed by a content management system if content is to remain current. It is necessary, however, that any modification to digital content not lessen search effectiveness of search queries applied to the digital content. The embodiments disclosed herein address and provide solutions to such problems.

Referring still to FIG. 4, content management system 400 illustratively includes content validation system 500. Content validation system 500 can be integrated with the content management system 400 as shown or, in different embodiments, can be implemented separately as part of stand-alone system on separate data processor (e.g., a cloud computing node) that can communicatively couple with the content management system 400.

Content validation system 500 provides an extended content management system or otherwise improves the performance of a content management system by ensuring that the training data used to train a ranking model sufficiently covers any modification made to managed digital content. In various embodiments, content validation system 500 automatically extends a set of training data as necessary to sufficiently cover digital content revisions. In other embodiments, content validation provides interactive capabilities, including an optional user interface, that enables the user-author of any such modification to extend the coverage of the set of training data. Content validation system 500 can also automatically re-initiate training of the ranking model using the extended set of ranking training data if the earlier-trained model yields poor search results.

Accordingly, content validation system 500 enhances performance of content management system 400 by enabling digital content modifications without increasing the risk that the ranking model is trained using a set of training data that insufficiently covers the modification of digital content. Content validation system 500 further enhances performance of content management system 400 by re-initiating training of the ranking model using the extended training set as necessary to improve search quality after modification of the digital content. This ensures that content management system 400 responds adequately to search queries, thus ensuring efficient searching and mitigating the risk of user frustration in searching for digital content.

Figure 5:
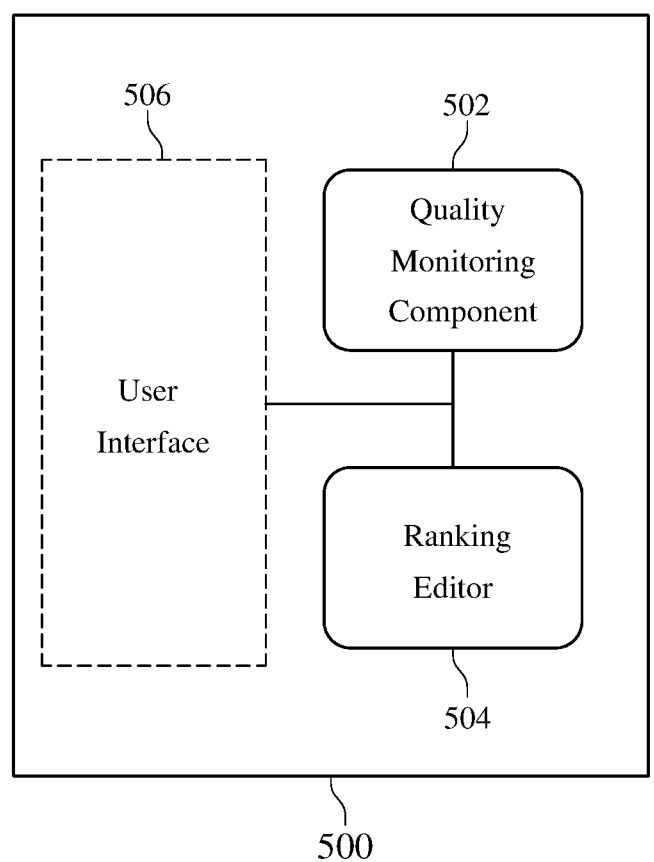
FIG. 5 depicts an architecture of a content validation system according to an embodiment of the present invention.

Referring additionally now to FIG. 5, content validation system 500 illustratively comprises quality monitoring component 502 and ranking editor 504. Optionally, content validation system 500 can also include user interface 506. Content validation system 500 can be implemented in computer-executable code that executes on the same device supporting the content management system. In another embodiment, content validation system 500 can be implemented in computer-executable code that runs on a separate data processing system, such as a server (e.g., a cloud-based server). The server can communicatively couple with one or more content management systems via a network connection and provide the same functionality as though implemented as an integrated system within a content management system.

Figure 6A:
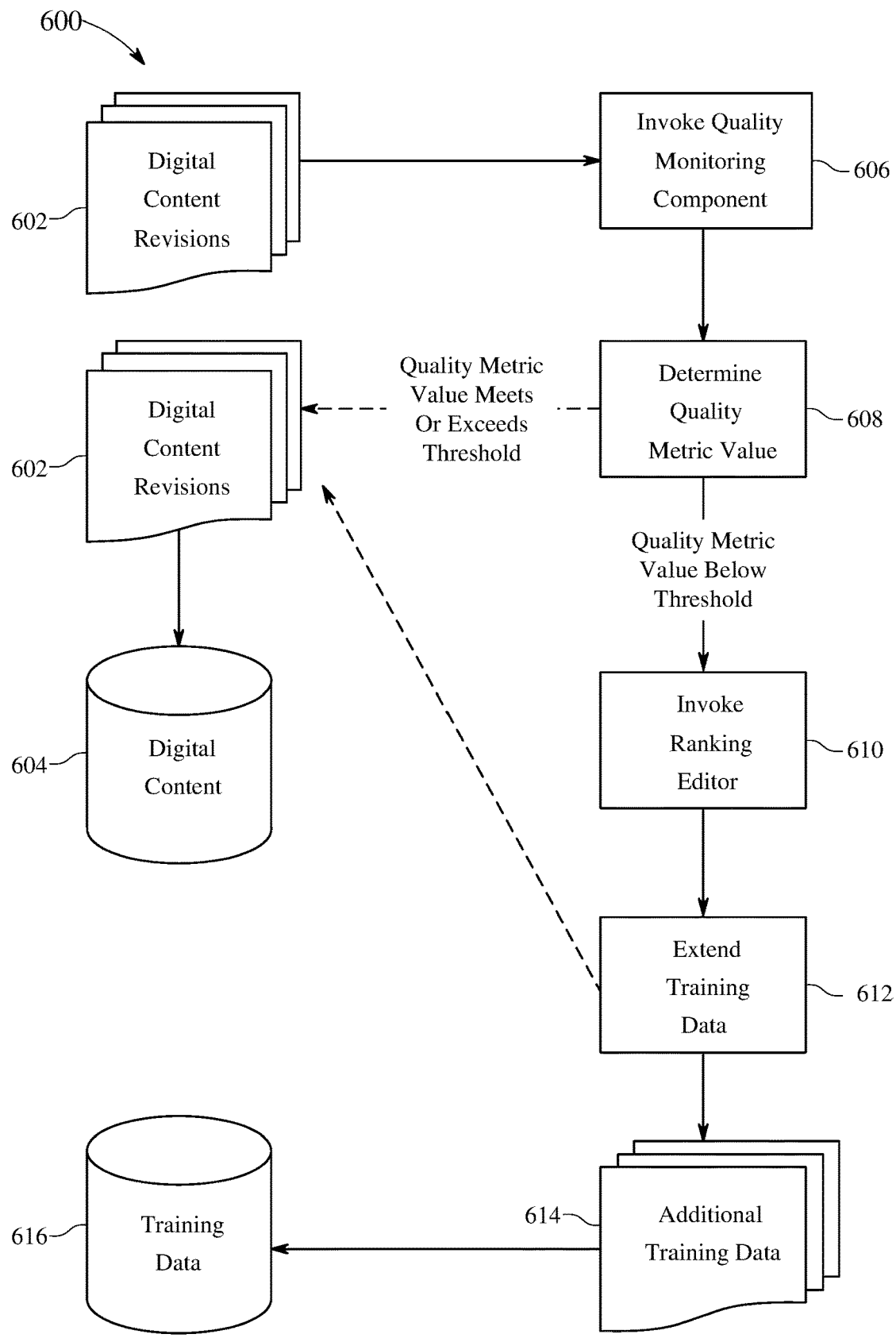
FIGS. 6A and 6B depict operative features of a content validation system according to an embodiment of the present invention.

FIG. 6A depicts operative features of content validation system 500 according to one embodiment. A user-author initially creates digital content revisions 602. Revisions of digital content include adding new digital content items (e.g., text documents, webpages, images, videos, code scripts, other electronically formatted data) or otherwise modifying digital content managed by a content management system.

Before the digital content revisions 602 are incorporated into an existing set of digital content 604 managed by a content management system, quality monitoring component 502 is invoked at 606. Quality monitoring component 502 can be invoked in response to the user-author's attempt to save digital content items after editing. Alternatively, quality monitoring component 502 can be invoked when the user-author sends an indexing request to the search service. Quality monitoring component 502 determines, at 608, a quality metric value that indicates the degree to which a current set of training data covers the revised digital content. The training data is used by the content management system to train the ranking model that ranks responses to search queries.

The quality metric whose value is determined by quality monitoring component 502 can be a ground truth coverage metric. The quality metric can be computed based on various factors. The factors can include the number of search queries, the number of samples of items contained in a sample response to a search query, the number of times the revised digital content items are referenced in a sample, the distribution of quality metrics of all training samples, the quality metric distribution of the revised or added digital content items, and other comparable factors. Any factor can be used that reliably indicates the degree to which a set of training data covers the digital content for which the search model is trained to search. In a particular embodiment, the quality metric is a ground truth coverage metric calculated based on the number of 2-tuple samples (e.g., <item I.D., rank value>) that reference a digital content item that is newly added or revised as part of the digital content revisions 602.

Quality monitoring component 502, in determining the quality metric value at 608, can retrieve current training data and identify samples that reference the digital content items corresponding to digital content revisions 602. A predetermined threshold can be compared to the quality metric to determine whether the training sample sufficiently covers digital content revisions 602. If the difference or deviation between the two values exceeds a predetermined amount, then coverage is insufficient. For example, using a quality metric whose value is the number of 2-tuple samples that reference a digital content item, if the number meets or exceeds a predetermine threshold, the digital content revisions 602 are incorporated into the digital content 604. Otherwise, if the quality metric value (e.g., number of 2-tuple samples) is below the threshold, ranking editor 504 is invoked at 610.

Optionally, quality monitoring component 502 can block saving to a memory the newly added content items and/or other digital content revisions if the quality metric value fails to satisfy the predetermined threshold condition (however defined). Quality monitoring component 502 can cause the display of a warning message. Additionally, or alternatively, the quality monitoring component can flag the content and prohibit publishing the content. Publishing can remain blocked while the content remains flagged. This allows the user-author to continue editing and until the point that the set of training data is extended to adequately cover the digital convent revisions 602.

Ranking editor 504, at 612, extends the current set of training data by creating an additional training data 614. Ranking editor 504 can extend the set of training data by automatically generating sample queries and samples (responsive to the queries) that reference newly added or revised digital content and adding both the sample queries and samples to the current set of training data. For example, in the context of the digital music store, to cover newly added classical music content, a sample query can be "find me some good Beethoven," which returns a three 2-tuples comprising an I.D. and rank value. Ranking editor 504 can generate enough new samples referencing the digital content revisions 602 to bring the quality metric value up to the predetermined threshold.

Figure 6B:
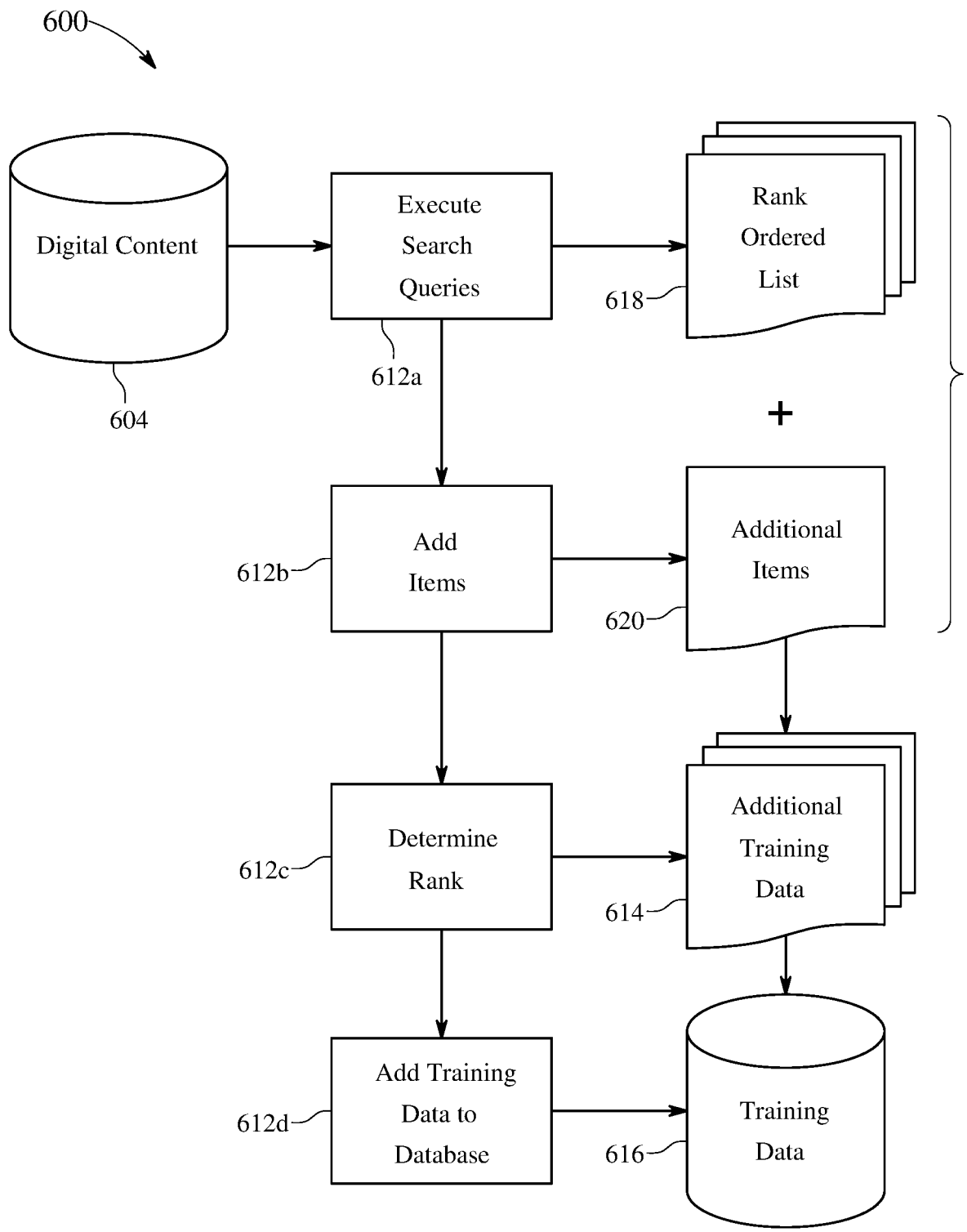

Referring additionally now to FIG. 6B, an example implementation of block 612, the procedure implemented with ranking editor 504, is illustrated. At 612a, the search queries are executed on a corpus of content items (digital content 604). The search queries can be randomly selected from a predefined set of search queries. Execution of the search queries yields a rank ordered list of items 618 that is returned in response to the queries. The rank ordered list 618 is determined using a ranking model that is based on an existing pre-extended corpus of training data. At 612b, additional items 620 that cover the digital content revisions 602 are added by inserting the items into the rank ordered list 618. The rank of each additional item can be determined at 612c from the position of the item within the list, calculated as the average of the two list items immediately adjacent. The combined items (including the computed ranks of the one or more newly added items) are added to the pre-extended corpus of training data at 612d, thereby creating the extended set of training data 616 that adequately covers the digital content revisions 602.

Ranking editor 504 optionally includes user interface 506, which allows for user input in extending the set of training data. With user interface 506, the user-author can visually edit and extend the current set of training data. Initially, the ranking editor 504 can invoke an authoring component API to retrieve the current set of training data and invoke search service 408 to execute the selected search queries. Visual representations of the search results (digital content items) can be displayed in the order in which the digital content items are ranked using the current ranking model. To extend the set of training data, sample items that reference content items from the digital content revisions 602 can be added to the current set of training data, as described above. User interface 506 allows the user-author to drag and drop visual representations of selected sample items into the list of ordered digital content and the procedure continues automatically thereafter as described above.

Ranking editor 504 can determine whether the ranking model is re-trained using the additional training data 614. The determination is made by ranking editor 504 comparing the extended set of training data 616, which include additional training data 614 added to the pre-extended set of training data 611. If the ratio of changed lines (or 2-tuples) in the extended set of training data exceeds a predetermined threshold, then the ranking model is re-trained using the extended set of training data 6161, which includes the additional training data 614. The validation system 500 can store the re-trained ranking model to use for subsequent rankings of search results generated in response to future search queries.

Figure 7A:
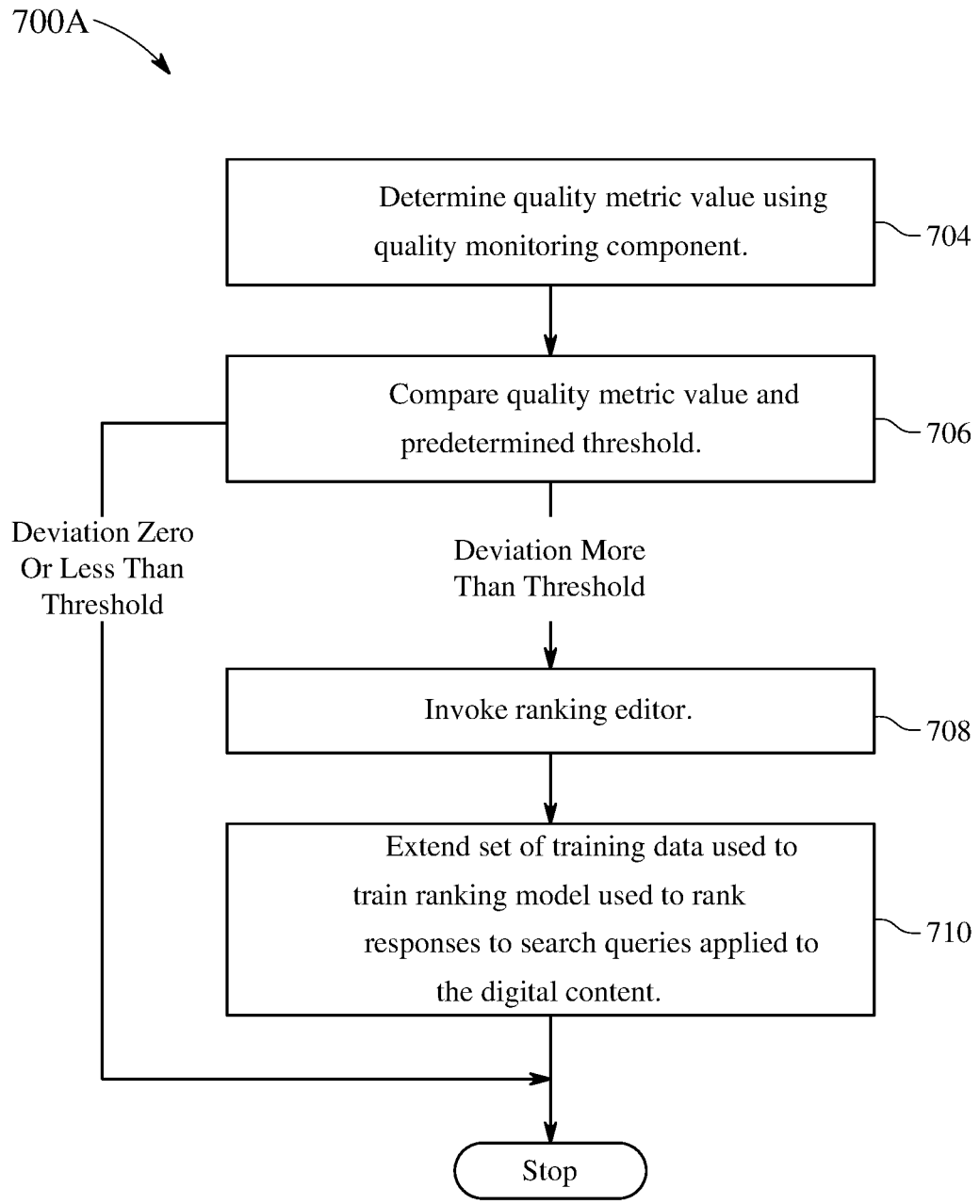
FIG. 7A is a flowchart of a method of content validation according to an embodiment of the present invention.

FIG. 7A is a flowchart of a method 700A of content validation according to one embodiment. Method 700 can be performed by a system the same or similar to the system described in connection with FIGS. 1 through 6A and 6B. The method begins with revisions to digital content that is managed by a content management system. At 704, in response to the revisions to the digital content, the value of a quality metric is determined. The quality metric indicates the degree to which the digital content revisions are covered by a training set for training a ranking model.

If the quality metric value equals or deviates from a predetermined threshold by less than a predetermined amount at 706, then no action is taken. That is, the digital content revisions are deemed to be sufficiently covered by the current set of training data and therefore can be added to or incorporated in the current set of digital content managed by the content management system.

If at 706, however, the quality metric value deviates from the predetermined threshold by more than the predetermined amount, then a ranking editor is invoked at 708. At 710, the ranking editor extends the set of training data that is used to train a ranking model for ranking responses to search queries applied to the digital content. Optionally, the extended set of training data can be used to re-train the ranking model.

Figure 7B:
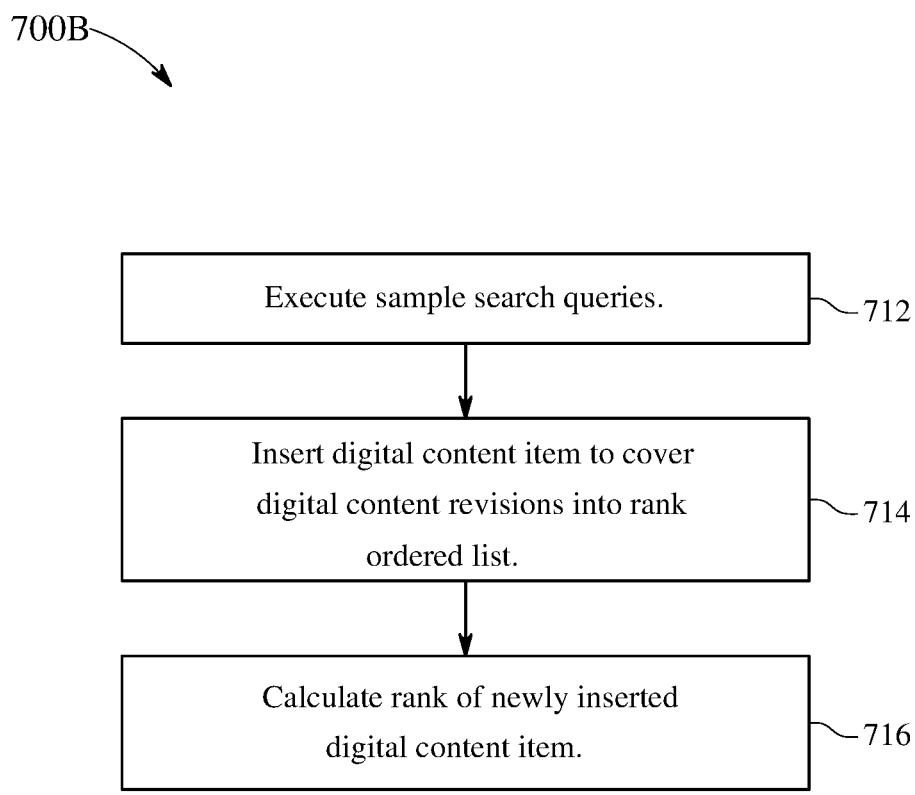
FIG. 7B is a flowchart of a method of extending a set of training data according to an embodiment of the present invention.

FIG. 7B is a flowchart that illustrates a method 700B for extending the set of training data. The extending of the set of training data can begin at 712 with the execution of sample search queries. The search queries can be randomly selected. The digital content items returned are rank ordered according to a predefined ranking model. At 714, one or more digital content items that cover the digital content revisions are inserted into the rank ordered list. Rankings of the one or more revised digital content items are determined at 716. The rankings can be computed by calculating an average of rankings associated with items immediately adjacent to each digital content item inserted into the list.

According to one embodiment of method 700A, any addition of revised digital content to the digital content managed by a content management system can be blocked if the quality metric deviates from the predetermined threshold value by more than the predetermined amount. In another embodiment, method 700A can include blocking publishing revised digital content in response to the quality metric value deviating from the predetermined threshold value by more than the predetermined amount.

Figure 8:
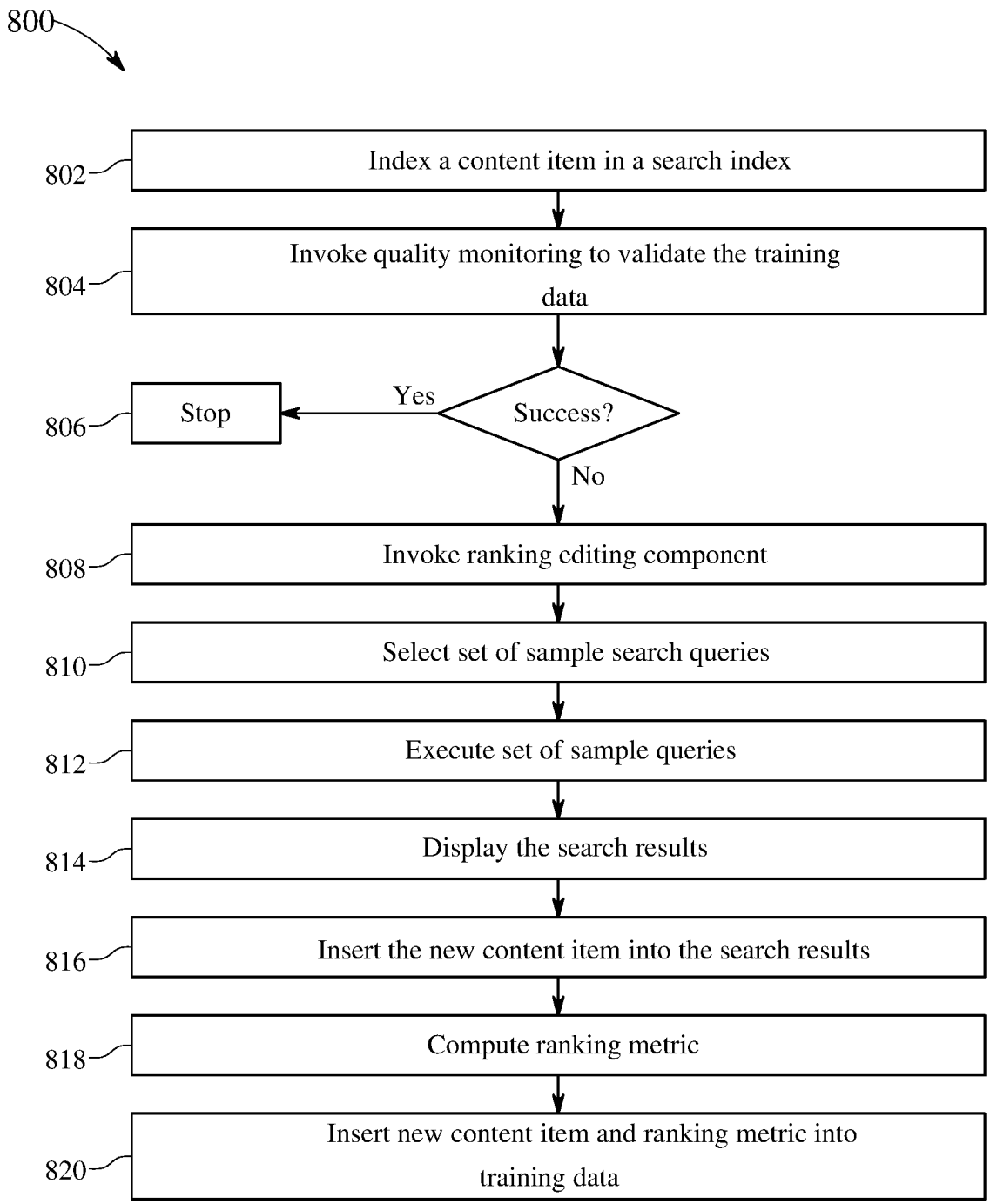
FIG. 8 is a flow chart of a method of content validation according to another embodiment of the present invention.

FIG. 8 is a flow chart of a method 800 of content validation according to another embodiment. Method 800 also can be performed by a system the same or similar to the system described in connection with FIGS. 1 through 6A and 6B. The method begins at 802 with a user-author invoking a call to index a newly added or revised digital content item in a search index. The action invokes a quality monitoring component at 804 to validate that the current set of training data covers the revised digital content. If the set of training data covers the revised digital content, the procedure ends at 806. Otherwise, the ranking editing component is invoked at 808. A set of sample search queries is selected at 810. Optionally, the queries can be randomly selected.

The sample search queries are executed at 812, and the results (returned digital content items) are displayed at 814. New digital content items are inserted into the search results at 816 and a corresponding rank metric for the new digital content items are computed at 818. At 820, the new digital content item and corresponding ranking metric are inserted into the set of training data.

The methods as illustrated by flowcharts in FIGS. 7A, 7B, and 8 can be implemented in a computer program product.

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments discloses. Many modifications and variations will be apparent to those of ordinary skill in the art without departing from the scope and spirit of the described embodiments. The terminology used herein was chosen to best explain the principles of the embodiments, the That which is claimed is:

1. A method, comprising:

determining, with computer hardware, a quality metric value indicating a degree to which a current set of training data covers revised digital content managed by a content management system in response to the digital content being revised, the quality metric value indicating coverage of the revised digital content by a set of training data used to train a ranking model for ranking responses to search queries of the digital content;

invoking a ranking editor in response to the quality metric value deviating from a predetermined threshold by more than a predetermined amount, the ranking editor invoking a search service to execute search queries;

the ranking editor extending the set of training data by inserting into the set of training data items corresponding to revisions of the digital content in a rank ordered list of items returned in response to the search queries, the items ranked according to their relevance to search terms of the search queries, wherein the ranking editor initiates a machine learning algorithm that constructs a ranking model based on the set of training data and uses the ranking model to rank the digital content in response to the digital content being returned in response to another search query, wherein the extending comprises inserting at least one revised digital content item into a list of digital content items returned in response to a set of randomly selected search queries, wherein the digital content items returned are rank ordered according to a predefined ranking model; and computing a ranking of the at least one revised digital content item, wherein the computing comprises calculating an average of rankings associated with digital content items adjacent to the revised digital content item inserted into the list of digital content items.

2. The method of claim 1, further comprising re-training the ranking model using an extended set of training data generated by the extending.

3. The method of claim 1, further comprising blocking addition of revised digital content to digital content managed by the content management system in response to the quality metric value deviating from the predetermined threshold by more than the predetermined amount.

4. The method of claim 1, further comprising blocking publishing of revised digital content in response to the quality metric value deviating from the predetermined threshold by more than the predetermined amount.

5. A system, comprising:

at least one processor programmed to initiate executable operations, the executable operations including:

determining a quality metric value indicating a degree to which a current set of training data covers revised digital content managed by a content management system in response to the digital content being revised, the quality metric value indicating coverage of the revised digital content by a set of training data used to train a ranking model for ranking responses to search queries of the digital content;

invoking a ranking editor in response to the quality metric value deviating from a predetermined threshold by more than a predetermined amount, the ranking editor invoking a search service to execute search queries;

the ranking editor extending the set of training data by inserting into the set of training data items corresponding to revisions of the digital content in a rank ordered list of items returned in response to the search queries, the items ranked according to their relevance to search terms of the search queries, wherein the ranking editor initiates a machine learning algorithm that constructs a ranking model based on the set of training data and uses the ranking model to rank the digital content in response to the digital content being returned in response to another search query, wherein the extending comprises inserting at least one revised digital content item into a list of digital content items returned in response to a set of randomly selected search queries, wherein the digital content items returned are rank ordered according to a predefined ranking model; and computing a ranking of the at least one revised digital content item, wherein the computing comprises calculating an average of rankings associated with digital content items adjacent to the revised digital content item inserted into the list of digital content items.

6. The system of claim 5, further comprising re-training the ranking model using an extended set of training data generated by the extending.

7. The system of claim 5, further comprising blocking addition of revised digital content to digital content managed by the content management system in response to the quality metric value deviating from the predetermined threshold by more than the predetermined amount.

8. A computer program product, comprising:

a computer-readable storage medium having program code stored thereon, the program code executable by computer hardware to initiate operations including:

determining a quality metric value indicating a degree to which a current set of training data covers revised digital content managed by a content management system in response to the digital content being revised, the quality metric value indicating coverage of the revised digital content by a set of training data used to train a ranking model for ranking responses to search queries of the digital content;

invoking a ranking editor in response to the quality metric value deviating from a predetermined threshold by more than a predetermined amount, the ranking editor invoking a search service to execute search queries;

the ranking editor extending the set of training data by inserting into the set of training data items corresponding to revisions of the digital content in a rank ordered list of items returned in response to the search queries, the items ranked according to their relevance to search terms of the search queries, wherein the ranking editor initiates a machine learning algorithm that constructs a ranking model based on the set of training data and uses the ranking model to rank the digital content in response to the digital content being returned in response to another search query, wherein the extending comprises inserting at least one revised digital content item into a list of digital content items returned in response to a set of randomly selected search queries, wherein the digital content items returned are rank ordered according to a predefined ranking model; and computing a ranking of the at least one revised digital content item, wherein the computing comprises calculating an average of rankings associated with digital content items adjacent to the revised digital content item inserted into the list of digital content items.

9. The computer program product of claim 8, further comprising re-training the ranking model using an extended set of training data generated by the extending.

10. The computer program product of claim 8, further comprising blocking addition of revised digital content to digital content managed by the content management system in response to the quality metric value deviating from the predetermined threshold by more than the predetermined amount.

11. The computer program product of claim 8, further comprising blocking publishing of revised digital content in response to the quality metric value deviating from the predetermined threshold by more than the predetermined amount.

* * * * *